Figure 1:
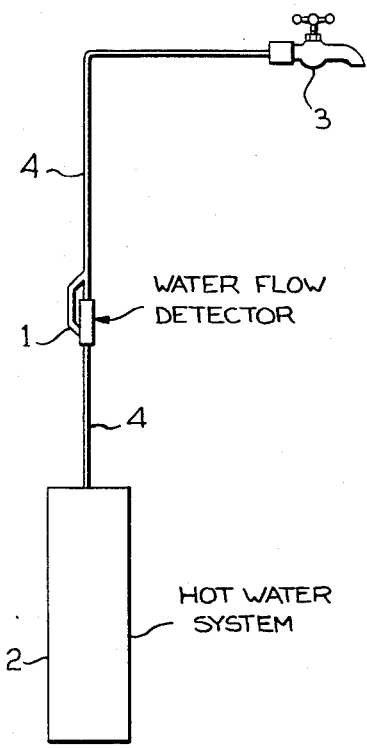

United States Patent [19]

Lawless

[11] Patent Number: 4,497,434
[45] Date of Patent: Feb. 5, 1985

[54] DETECTOR OF THE FLOWING OF A FLUID IN A PIPE AND ENERGY SAVING DEVICE FOR A HOT WATER SYSTEM USING THIS DETECTOR

[76] Inventor: Jacques Lawless, 1740, 7th. Ave., Grand-Mere, (Quebec), Canada, G9T 2E1

[21] Appl. No.: 483,690

[22] Filed: Apr. 11, 1983

[51] Int. Cl.$^3$ .............................................. F22B 35/00
[52] U.S. Cl. .................................. 236/23; 236/25 A; 116/204; 116/264
[58] Field of Search ................ 340/606, 611; 307/118; 73/816.47, 816.57, DIG. 5; 116/204, 261, 264, 273; 336/30 A, 45; 236/23, 25 A

[56] References Cited

U.S. PATENT DOCUMENTS 4,371,779  2/1983  Maynard et al. ................ 236/25 R

FOREIGN PATENT DOCUMENTS 2236091  4/1973  Fed. Rep. of Germany ...... 116/204

Primary Examiner—William E. Wayner
Assistant Examiner—J. Sollecito
Attorney, Agent, or Firm—Robic, Robic & Associates

[57] ABSTRACT

A fluid flow sensor, comprising a tubular element having a greater diameter than and vertically mounted on a pipe for serially interconnecting two portions of this pipe. One portion is connected to the upper end of the tubular element while the other portion is connected to its lower end. A magnetic piston is slidably mounted within the tubular element and is therefore free to move along it. A by-pass conduit interconnects the lower portion of the pipe with the upper portion of the pipe. The piston moves upwardly in the tubular element when the fluid flows. Fluid flows from the portion of the pipe connected at the lower end of the tubular element to the one connected at its upper end through the by-pass. The piston moves downwardly by gravity to the lower end of the tubular element when the fluid stops flowing. A coil wound around a portion of the tubular element produces in electrical signal when the piston moves in the tubular element. The piston has a frustroconical element on each end to absorb shocks which result when the piston seats in each position. This detecting device can be mounted on a hot water supply pipe and used in combination with an electronic circuit for saving energy in operating a hot water system. The electronic circuit allows or prevents the thermostat to control the water heating apparatus.

11 Claims, 5 Drawing Figures

U.S. Patent   Feb. 5, 1985   Sheet 1 of 2   4,497,434

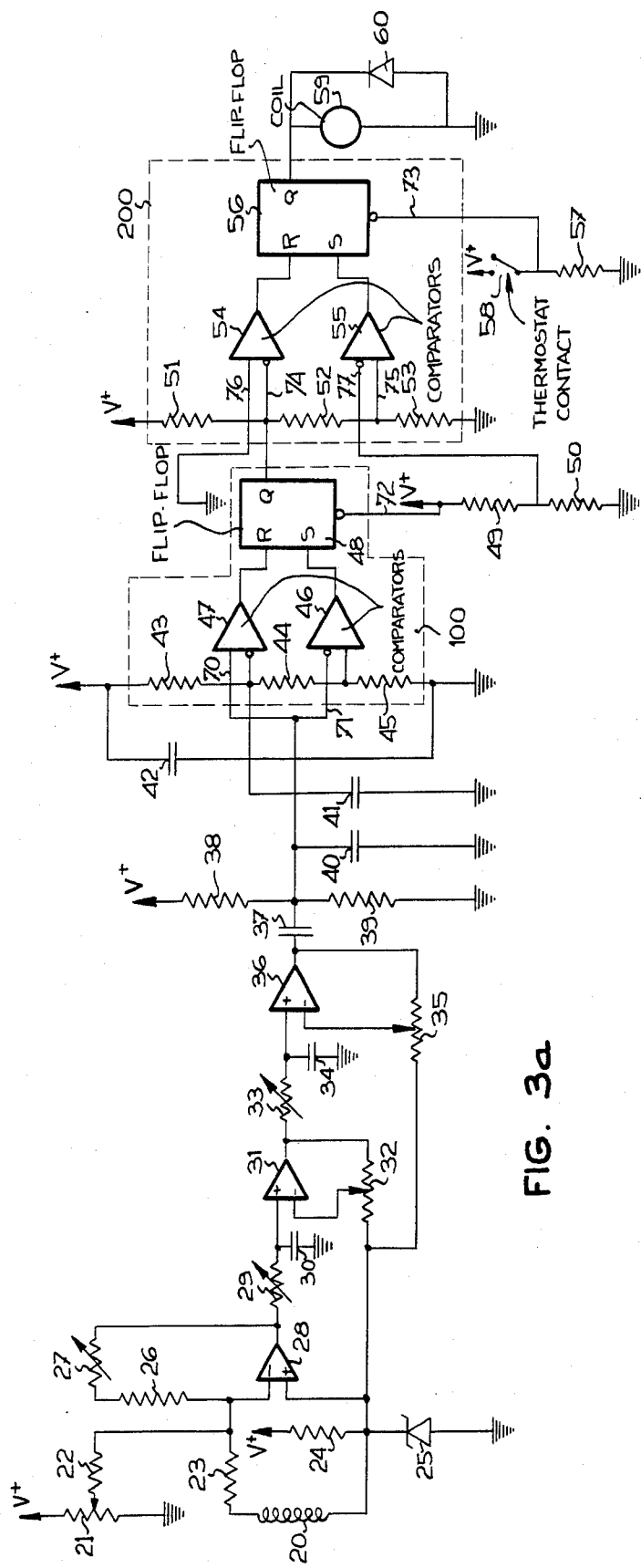
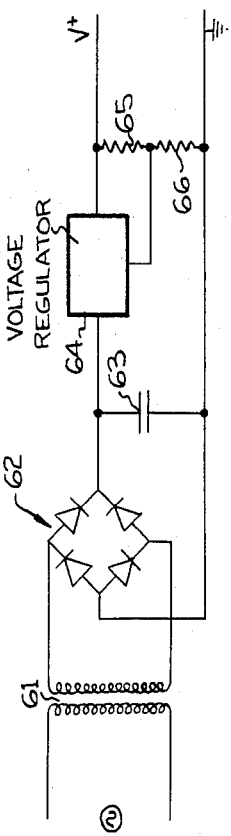
FIG. 3a
FIG. 3b

DETECTOR OF THE FLOWING OF A FLUID IN A PIPE AND ENERGY SAVING DEVICE FOR A HOT WATER SYSTEM USING THIS DETECTOR

The present invention relates to a device for detecting the flowing of a fluid in a pipe such as, for example, the flowing of hot water in a hot water supply pipe. Such a detecting device may be used in combination with an electronic control circuit to form a device for saving energy in operating a hot water system of the type comprising a tank for stocking hot water, an apparatus for heating the water within the tank, and a thermostat for controlling the operation of this heating apparatus in accordance with the temperature of the water in the tank.

Saving devices of the type described above are already known and some of them are disclosed by way of example, in U.S. Pat. Nos. 1,561,277; 3,068,387; 4,127,085; 3,489,205 and 3,627,202. As detecting and controlling means, these known devices comprise either pressure responsive controllers, or mechanical distributing systems responsive of the differences of pressures when the fluid is flowing, or relatively complex electromagnetic mechanisms responsive to the pressure and speed of the fluid.

In operation, most of the known saving devices automatically switch off the water heating apparatus forming part of the hot water system when no hot water is drawn from the system, as it is very expensive to hold the hot water stocked in the hot water tank at a constant temperature. As the hot water tanks presently available on the market, such as, for example, the domestic hot water tanks, are provided with a relatively good insulation, the decrease in temperature of the hot water stocked therein is of about 20° F. for a complete night. Hot water is therefore still available in the morning and consequently, there is no great disadvantage in switching off the water heating apparatus for the night. Moreover, in the case of long absence, or of vacations of the consumers, there is substantial advantage in using a saving device which stops operation of the hot water system and thus prevents energy from being unnecessarily consumed.

An object of the present invention is to provide a detector especially designed for delivering an electrical signal as soon as a fluid flows or stops flowing in a pipe, which detector advantageously distinguishes over the known detecting devices in that it is structurally very simple, effective and easily adaptable to an electronic circuit for controlling the operation of a hot water system in view of saving energy.

Another object of the present invention is to provide a saving device that can be mounted on a hot water system to prevent the operation of the water heating apparatus of this system when no hot water is used.

More particularly, the present invention proposes a device for detecting the flowing of a fluid within a pipe. This device comprises:

a tubular element vertically mounted on the pipe for serially interconnecting two portions of this pipe, the tubular element comprising an upper end and a lower end, one of these portions being connected to the upper end of the tubular element and the other portion to its lower end;

a piston made of a magnetic material slidably mounted within the tubular element, this piston being free to move along the tubular element, and a by-pass conduit interconnecting a part of the tubular element adjacent to its lower end with the one portion of the pipe to allow the fluid to flow from this part of the tubular element to the one portion of the pipe, and therefore from the other portion of the pipe to its one portion.

The piston moves upwardly in the tubular element as soon as the fluid starts to flow to allow this fluid to flow from the other portion of the pipe to the one portion of the same through the by-pass conduit. On the other hand, the piston moves down hardly by gravity towards the lower end of the tubular element as soon as the fluid stops flowing.

The detecting device further comprises means mounted on the tubular element and responsive to the magnetic material of the piston for producing an electrical signal every time the piston moves the tubular element.

In accordance with a preferred embodiment of the invention, the tubular element has a section greater than the section of the pipe. Each portion of the pipe is connected substantially in the middle of the corresponding end of the tubular element. The piston has upper and lower ends each provided with a frusto-conical element. Each portion of the pipe adjacent to the tubular element is so shaped to match with the corresponding frusto-conical element of the piston. In operation, these frusto-conical elements cooperate with the shaped ends of the portions of the pipe for absorbing shocks when the piston reaches one of the two portions of the pipe in order to eliminate noise resulting from these shocks.

The present invention also proposes a device for saving energy in operating a hot water system of the type comprising a tank for stocking hot water, an apparatus for heating the water within the tank, and a thermostat for controlling the operation of the heating apparatus in accordance with the temperature of the water in the tank. This saving device comprises:

a detecting device according to the invention mounted on a hot water supply pipe extending from the tank to a hot water supply such as a tap; and an electronic circuit for allowing or preventing the thermostat to control the operation of the water heating apparatus, in accordance with the electrical signals produced by the detecting device.

In accordance with a preferred embodiment of the invention, the electronic circuit comprises:

means for amplifying each electrical signal produced by the detecting device;

means for detecting each amplified electrical signal and for memorizing the last occurred amplified signal, this detecting and memorizing means delivering an output signal indicating if hot water is flowing or not within the hot water supply pipe; and means connected to the thermostat for allowing or preventing this thermostat to control operation of the water heating apparatus, in accordance with the output signal from said detecting and memorizing means.

Preferably, the allowing or preventing means comprises means for allowing the thermostat to fully control the operation of the water heating apparatus when the output signal of the detecting and memorizing means indicates that hot water is flowing in the hot water supply pipe, means for allowing the thermostat to stop the operation of the water heating apparatus when the output signal from the detecting and memorizing means indicates that hot water is not flowing in the supply hot water pipe while the water heating apparatus is still operating and for holding the apparatus in non-operating condition until this output signal indicates that the hot water is flowing again in said hot water supply pipe, and means for holding the water heating apparatus in non-operating condition when said output signal indicates that the hot water is not flowing in the hot water supply pipe while the water heating apparatus is not operating until this output signal indicates that the hot water is flowing again in the hot water supply pipe.

A further object of the present invention is to provide a method for saving energy in operating a hot water system of the type comprising a tank for stocking hot water, an apparatus for heating the water within the tank, and a thermostat for controlling the operation of the heating apparatus in accordance with the temperature of the water in the tank. This method comprises the steps of:

detecting the flowing of hot water in a hot water supply pipe extending from the tank to a hot water supply;

controlling the water heating apparatus through the thermostat when hot water is flowing in the hot water supply pipe;

stopping the operation of the water heating apparatus through the thermostat, after the water has stopped flowing in the hot water supply pipe while the water heating apparatus is operating, and holding the apparatus in nonoperating condition until the hot water flows again in the hot water supply pipe; and holding the water heating apparatus in a nonoperating condition when the hot water stops flowing in the hot water supply pipe during the water heating apparatus is not operating until the hot water flows again in the hot water supply pipe.

Figure 2A:
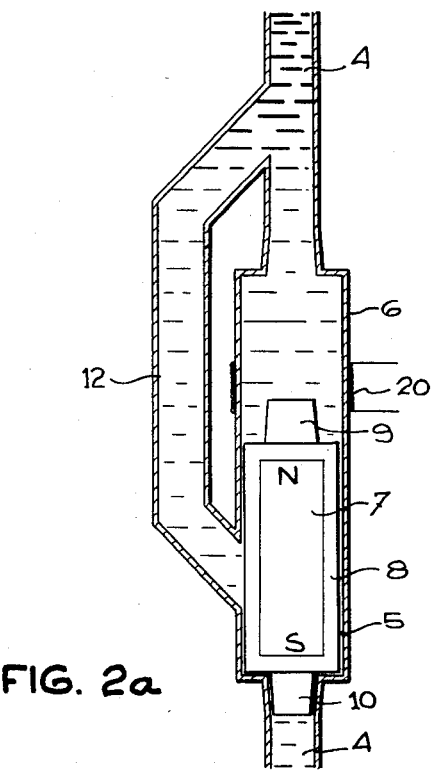
Figure 2B:
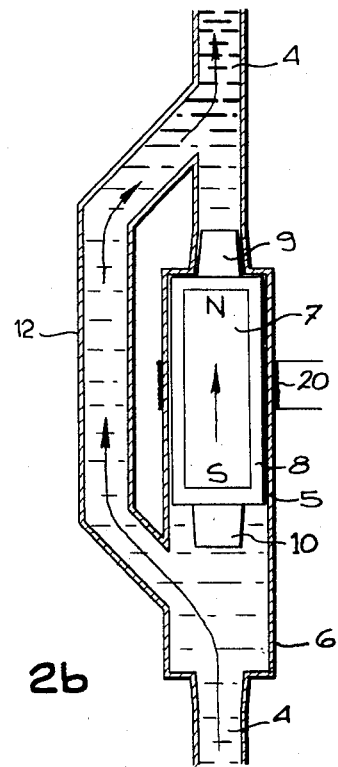

The objects, advantages and other features of the present invention will become more apparent from the following non restrictive description of a preferred embodiment thereof, made with reference to the accompanying drawings, in which:

FIG. 1 schematically shows the pipe connection of a hot water system to a tap, with a device according to the invention for detecting the flowing of hot water within this pipe;

FIGS. 2a and 2b show a detailed embodiment of the water flow detecting device of FIG. 1; and FIGS. 3a and 3b show an embodiment of an electronic circuit which may be used in combination with the water flow detecting device of FIGS. 2a and 2b for controlling the operation of the heating apparatus of a hot water system in accordance with signals delivered by this water flow detecting device.

The preferred embodiment described hereinafter relates to a device for use in detecting the flow of water within a pipe, but it is evident that such a device could also be used for detecting the flow of fluids other than water, such as air, oil, fuel, gas, etc.

As shown in FIG. 1, the water flow detector 1 according to the invention is mounted on a pipe 4 which supplies hot water from a hot water system 2 to a hot water supply consisting of a tap 3.

The hot water system 2 comprises a tank for stocking hot water and an apparatus for heating the water stocked into the tank. The hot water system 2 also comprises a thermostat for controlling the operation of the heating apparatus in accordance with the temperature of the water in the tank.

The operation and structure of the water flow detector 1 will now be described with reference to FIGS. 2a and 2b.

The detector 1 comprises a piston 5 slidably mounted within a tubular element 6. This tubular element preferably is a hollow cylinder. As shown in FIGS. 1, 2a and 2b, the cylinder 6 vertically mounted on the pipe 4 for serially interconnecting two portions of this pipe. The cylinder has its ends partially closed as its diameter is greater than the diameter of the pipe 4.

The piston 5 is made of a cylindrically-shaped permanent magnet 7 having its magnetization axis aligned with its longitudinal axis. This magnet is coated with a shell 8 made of teflon or any other suitable material. The piston 5 also comprises two frusto-conical elements 9 and 10 each mounted at one end of the piston 5. These two elements 9 and 10 are preferably made of the same material as the shell 8 and may of course form part of this shell.

As shown on FIGS. 2a and 2b, the two portions of the pipe 4 interconnected by the cylinder 6, to which they are connected, have their parts adjacent to the cylinder 6, so shaped to match with the elements 9 and 10, respectively.

The elements 9 and 10 in combination with the shaped ends of the two portions of the pipe 4 are used for eliminating the noise resulting from shocks between the piston 5 and the two portions of the pipe 4 when the piston 5 moves within the cylinder 6.

The detector 1 also comprises a by-pass conduit 12 having its two ends connected to the lower part of the side wall of the cylinder 6 and to the pipe 4 above the cylinder 6, respectively. A coil 20, which may be connected to an electronic circuit, is wound around the upper part of the cylinder 6, as shown on FIGS. 2a and 2b.

As it will become more apparent thereinafter, the detector 1 must be mounted vertically, i.e. on a vertical part of the pipe 4 to operate.

When the tap 3 of FIG. 1 is closed, the piston 5 is in a lower position as shown on FIG. 2a since its mass density is higher than the mass density of water and since the pressure of the water is uniform within the water system.

When the tap 3 is opened, the pressure of the hot water drawn from the hot water system 2 moves upwardly the piston 5, thereby producing a lifting motion of the permanent magnet 7 inside the coil 20. This motion in turn induces a first low amplitude voltage signal, i.e. a first low amplitude pulse, between the two terminals of this coil. Of course, the cylinder 6 must be made of a material through which the movement of the magnet 7 can induce an electrical voltage between the terminals of the coil 20. As the piston 5 is held by the pressure of water in the upper position shown on FIG. 2b, hot water can flow from the hot water system 2 to the tap 3 through the pipe 4, the lower part of the cylinder 6 and the by-pass conduit 12.

As soon as the tap 3 is closed, the uniform pressure of water is re-established within the system 2, the pipe 4 and the detector 1. The piston 5 therefore moves downwardly by gravity to its initial position shown on FIG. 2a. This lowering motion of the magnet 7 inside the coil 20 generates between the terminals of this coil a second low amplitude voltage signal, i.e. a second low amplitude pulse, which is opposite to the first pulse because of the reverse motion of the magnet 7 inside the coil 20.

Of course, such a first or second low amplitude pulse is generated every time the piston 5 moves inside the coil 20.

As will now be described with reference to FIG. 3a, the low amplitude pulses generated by the coil 20 can be processed and used for controlling the heating apparatus of the hot water system 2.

First of all, the terminals of the coil 20 are connected to the input of an electronic circuit, in accordance with the winding direction of the coil, and the orientation of the poles of the permanent magnet so that each first pulse be a positive pulse and each second pulse be a negative pulse.

The electronic circuit comprises an inverting amplifier receiving the signals from the coil 20. This inverting amplifier comprises a first amplifier stage formed with an operational amplifier 28 and having a negative gain selected with resistors 23 and 26, and a potentiometer 27. A potentiometer 21, having its two fixed terminals connected to a positive DC voltage supply V+ and to the ground, respectively, and its adjustable sliding contact to the inverting input of the operational amplifier 28 through a resistor 22, is used for adjusting the offset voltage of the operational amplifier 28.

The inverting amplifier further comprises in series, following the first amplifier stage, a first adjustable low-pass filter formed with a potentiometer 29 and a capacitor 30, for filtering possible parasitic signals, a second amplifier stage comprising an operational amplifier 31 having a positive gain adjusted by a potentiometer 32, a second adjustable low-pass filter formed with a potentiometer 33 and a capacitor 34 also used for filtering parasitic signals, and a third amplifier stage comprising an operational amplifier 36 having a positive gain adjusted by a potentiometer 35.

A resistor 24 mounted in series with a Zener diode 25, are connected between the positive DC supply voltage V+ and the ground as shown on FIG. 3a and are provided for supplying an intermediate DC voltage level selected between the DC supply voltage V+ and the ground. This intermediate voltage is required for operating the inverting amplifier. As illustrated on FIG. 3a, this intermediate DC voltage is applied to a terminal of the coil 20, the non-inverting input of the operational amplifier 28 and to a fixed terminal of the potentiometers 32 and 35.

The amplified pulses at the output of the operational amplifier 36 are transmitted through a capacitor 37 to a circuit 100 for detecting each amplified pulse and memorizing the last detected pulse. This detecting and memorizing circuit comprises two comparators 46 and 47, a R-S flip-flop 48 and a voltage divider formed with resistors 43, 44 and 45, interconnected as shown on FIG. 3a.

The voltage divider formed with the resistors 43, 44 and 45 and connected between the positive DC supplies voltage V+ and the ground provides two treshold voltages corresponding respectively to two-thirds and the one-third of the voltage V+ which are applied to respective inputs of the comparators 46 and 47. Another voltage divider, connected between the DC supply voltage V+ and the ground, and formed with resistors 38, 39 and capacitor 40, is used for holding the voltage at the input 70 of the comparator 47 and at the input 71 of comparator 46 between the two above-mentioned treshold voltages when no pulses are supplied from the output of the operational amplifier 36.

Capacitors 41 and 42 are also provided for a better operation of the circuit while a reset input 72 of the flip-flop 48 is connected to the positive DC supply voltage V+.

The output of the detecting and memorizing circuit 100 is connected to a circuit 200 for controlling the action of the thermostat on the operation of the water heating apparatus of the hot water system. This circuit 200 comprises two comparators 54 and 55, a R-S flip-flop 56 and a voltage divider formed with resistors 51, 52 and 53 interconnected at the output of the circuit 100, i.e. at the output Q of the flip-flop 48, as shown on FIG. 3a. The input 76 of the comparator 54 is connected to the ground while the input 77 of the comparator 55 is supplied through a voltage divider formed with resistors 49 and 50. This voltage divider is connected between the positive DC supply voltage V+ and the ground.

The contact 58 of the thermostat of the hot water system 2 is connected between the positive DC supply voltage V+ and a reset input 73 of the flip-flop 56. The output Q of the flip-flop 56 supplies a coil 59 of an electromagnetic relay acting on the heating apparatus of the hot water system 2 for activating or de-activating this heating apparatus. When the heating apparatus is constituted, for example, by an oil furnace, the relay may activate or de-activate the motor of this furnace. When the apparatus is constituted by an electrical element, the relay can be replaced by or combined with an appropriate contact device.

A resistor 57 is shunt connected with respect to the reset input 73 of the flip-flop 56 and a protecting diode is connected in parallel with the coil 59, as shown on FIG. 3a.

Circuits 100 and 200 may be respectively formed with the first and second part of an integrated circuit of the type NE 556, made and commercialized by "TEXAS INSTRUMENTS INC.".

When a low amplitude positive pulse appears through the coil 20 as a result of hot water being drawn from the hot water system 2, an amplified negative pulse is produced at the output of the operational amplifier 36. This amplified negative pulse is transmitted through the capacitor 37 to both the input 70 of the comparator 47 and the input 71 of the comparator 46.

The level of the above mentioned amplified negative pulse is sufficient to produce a positive pulse at the output of the comparator 46 while the output of the comparator 47 remains "low". The pulse produced at the output of comparator 46 is supplied to the S input of the R-S flip-flop 48 having its reset input 72 connected to the supply voltage V+. A "high" level voltage is thereby produced at the output Q of the flip-flop 48 in response to the above mentioned negative amplified pulse. The flip-flop 48 memorizes this amplified negative pulse by holding its output Q to a high level until an amplified positive pulse occurs at the output of the operational amplifier 36.

The "high" level voltage at the output Q of the flip-flop 48 is applied to the input 74 of the comparator 54 and to the input 75 of the comparator 55 through resistors 52 and 53. A "high" level voltage is produced at the output of the comparator 55 in response to the "high" level voltage present at the output of the flip-flop 48. The voltage supplied at the input 77 of the comparator 55 is selected for this purpose. As the comparator 54 has its input 76 connected to the ground, the output of this comparator remains "low".

The S input of the flip-flop 56 connected at the output of comparator 55 being held to a "high" level, and the R input of flip-flop 56 connected at the output of comparator 54 being held to a "low" level, the contact 58 of the thermostat of the hot water system 2, which acts on the reset input 73 of the flip-flop 56 has a full control on the output Q of flip-flop 56 which controls the coil 59 of the electromagnetic relay. When the contact 58 is closed, the output Q of the flip-flop 56 is "high" thereby energizing the coil 59, and when the contact 58 is open, the output Q of the flip-flop 56 is "low", the coil 59 being therefore not energized.

A positive low-amplitude pulse generated through the coil 20 therefore enables the contact 58 of the thermostat of the hot water system 2 to fully control the operation of the heating apparatus of this hot water system 2.

When a negative low-amplitude pulse is generated through the coil 20, i.e. when the tap 3 is closed, an amplified positive pulse is transmitted through the capacitor 37 from the output of the operational amplifier 36 to the input 70 of the comparator 47 and the input 71 of the comparator 46. The amplitude of the above mentioned amplified positive pulse applied to comparators 46 and 47 is sufficient to produce a positive pulse at the output of the comparator 47 while the output of comparator 46 remains "low".

In response to the positive pulse at the output of the comparator 47 which is applied to the R input of the flip-flop 48, the output Q of this flip-flop becomes "low". The "low" level voltage at the output Q of the flip-flop 48 produces a "low" level voltage at the output of the comparator 55 while the output of the comparator 54 remains "low".

Therefore, if the thermostat contact 58 is closed when the coil 20 produces a negative low amplitude pulse, and since the S input of the flip-flop 56 becomes "low" and its R input remains "low", output Q of this flip-flop 56 will remain "high" thereby energizing the heating apparatus of the hot water system 2 until the contact 58 opens. Thereafter, when the contact 58 closes again, the output Q of flip-flop 56 will remain "low" for holding stopped the heating apparatus of the hot water system 2 until a new positive low amplitude pulse appears through coil 20.

If the thermostat contact 58 was open when the coil 20 produces a negative low-amplitude pulse, the output Q of flip-flop 56 would be low and would remain "low" after subsequent closing of the contact 58 for holding the heating apparatus of the system 2 stopped until a new positive low amplitude pulse is generated through the coil 20.

FIG. 3b illustrates an embodiment of the DC power supply circuit generating the positive DC supply voltage V+. This circuit comprises a transformer 61 having its primary winding connected to an A.C. source and its secondary winding connected to a bridge rectifying circuit 62 including four diodes. The circuit 62 delivers a fullwave rectified voltage to a capacitor 63. The voltage across the capacitor 63 supplies a voltage regulator 64 which produces the required positive DC supply voltage V+ selected by two resistors 65 and 66. This type of circuit is well-known in the art and will not be further elaborated.

As the present invention has been described with reference to a preferred embodiment, it is to be understood that modifications to the structure and operation of this embodiment and application thereof in other fields are not deemed to change the nature and object of the detecting device and electronic circuit of the present invention.

The embodiments of the invention in which an exclusive property or privilege is claimed are defined as follows:

1. A device for detecting the flowing of a fluid in a pipe, comprising:
   a tubular element vertically mounted on said pipe for serially interconnecting two portions of this pipe, said tubular element comprising an upper end and a lower end, one of said portions of the pipe being connected to said upper end of the tubular element and the other portion to its lower end;
   a piston made of a magnetic material slidably mounted within said tubular element, said piston being free to move along said tubular element;
   a by-pass conduit interconnecting a part of the tubular element adjacent to its lower end with said one portion of the pipe to allow the fluid to flow from said part of the tubular element to said one portion, and therefore from the other portion of the pipe to said one portion;
   said piston moving upwardly in said tubular element as soon as the fluid starts to flow, to allow said fluid to flow from said other portion to said one portion of the pipe through the by-pass conduit, said piston moving downwardly by gravity to the lower end of said tubular element as soon as the fluid stops flowing; and
   means mounted on the tubular element and responsive to said magnetic material for producing an electrical signal every time the piston moves in the tubular element, wherein:
   the tubular element has a section greater than the section of the pipe, each portion of the pipe being connected substantially in the middle of the corresponding end of the tubular element, and
   the piston has upper and lower ends each provided with a frusto-conical element, each portion of the pipe adjacent to the tubular element being so shaped to match with the corresponding frusto-conical element, said frusto-conical elements cooperating with the shaped ends of the portions of the pipe for absorving shocks when the piston reaches on of the portions of the pipe, in order to eliminate noise resulting from these shocks.

2. The device of claim 1, wherein the piston comprises a permanent magnet forming said magnetic material, said permanent magnet having a magnetization axis aligned with the longitudinal axis of said piston.

3. The device of claim 2, wherein the piston comprises a shell covering the permanent magnet.

4. The device of claim 2, wherein the signal producing means comprises a coil wound around another part of the tubular element adjacent to the upper end thereof.

5. The device of claim 1, wherein the piston comprises an outer shell and said two frusto-conical elements form part of said shell.

6. A device for saving energy in operating a hot water system of the type comprising a tank for stocking hot water, an apparatus for heating the water within the tank, and a thermostat for controlling the operation of said heating apparatus in accordance with the temperature of the water in said tank, said saving device comprising:

a detecting device as claimed in claim 1 mounted on a hot water supply pipe extending from the tank to a hot water supply, and an electronic circuit for allowing or preventing the thermostat to control operation of the water heating apparatus, in accordance with the electrical signals produces by said detecting device.

7. The saving device of claim 6, wherein the electronic circuit comprises:

means for amplifying each electrical signal produced by the detecting device;

means for detecting each amplified electrical signal and for memorizing the last occurred amplified signal, said detecting and memorizing means delivering an output signal indicating if hot water is flowing or not within the hot water supply pipe; and means connected to the thermostat for allowing or preventing this thermostat to control operation of the water heating apparatus, in accordance with the output signal from said detecting and memorizing means.

8. The saving device of claim 7, wherein the amplifying means includes means for filtering parasitic signals, said filtering means comprising at least one low-pass filter.

9. The saving device of claim 7, wherein said allowing or preventing means comprises means for allowing the thermostat to fully control the operation of the water heating apparatus when said output signal indicates that hot water is flowing in said hot water supply pipe.

10. The saving device of claim 7, wherein said allowing or preventing means comprises means for allowing the thermostat to stop the operation of the water heating apparatus when said output signal indicates that the water is not flowing in the hot water supply pipe while the water heating apparatus is still operating and for holding the apparatus in non operating condition until said output signal indicates that hot water is flowing again in said hot water supply pipe.

11. The saving device of claim 7, wherein said allowing or preventing means comprises means for holding the water heating apparatus in a non-operating condition when said output signal indicates that the hot water is not flowing in the hot water supply pipe while the water heating apparatus is non operating until said output signal indicates that the hot water is flowing again in the hot water supply pipe.

* * * * *